July 18, 1944. G. GERALDSON 2,354,084
TRACTOR ATTACHMENT
Filed Dec. 9, 1940 3 Sheets-Sheet 1
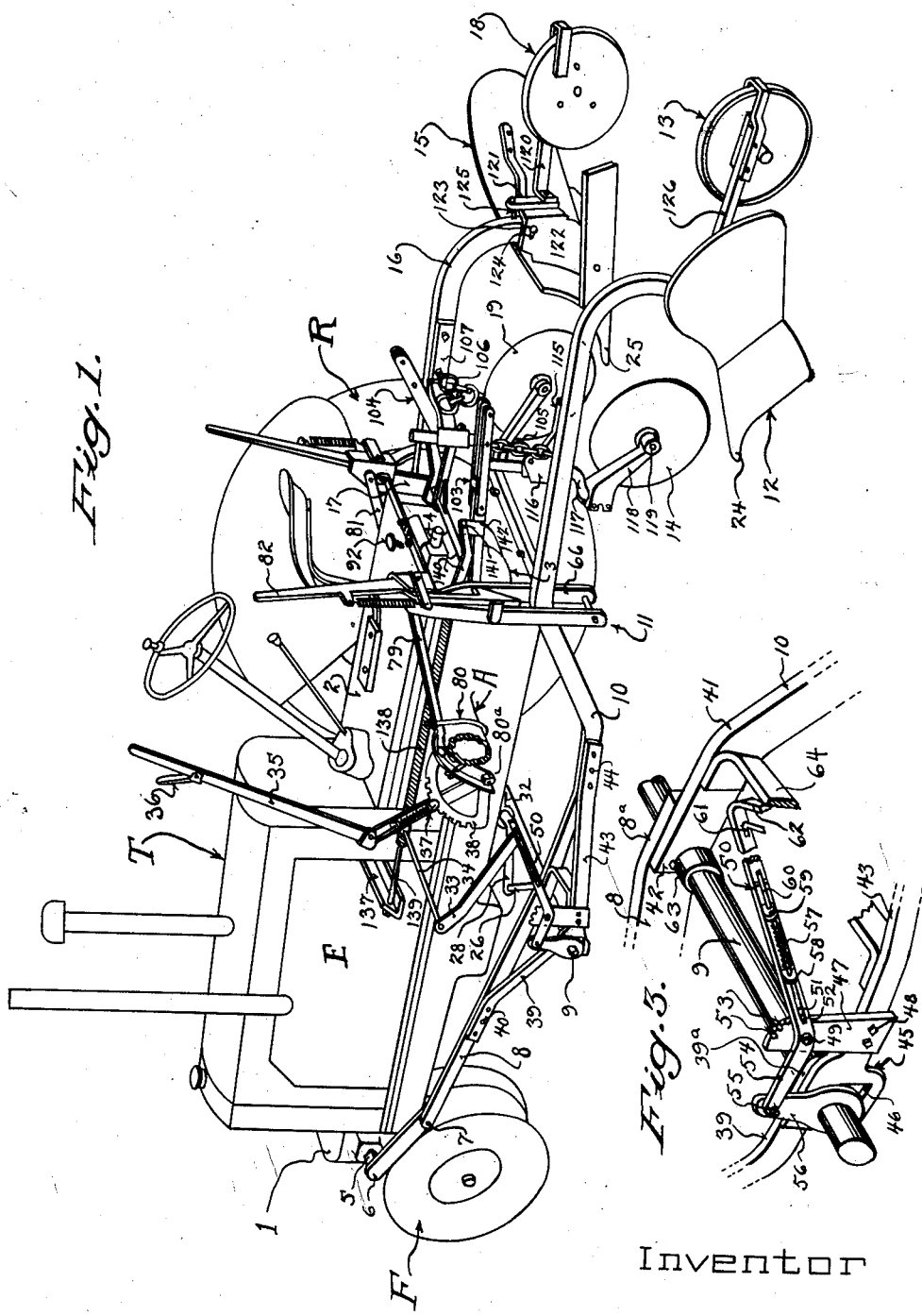
Inventor
Gerald Geraldson
By Emerson B. Donnell
Attorney July 18, 1944.   G. GERALDSON   2,354,084
TRACTOR ATTACHMENT
Filed Dec. 9, 1940   3 Sheets-Sheet 2
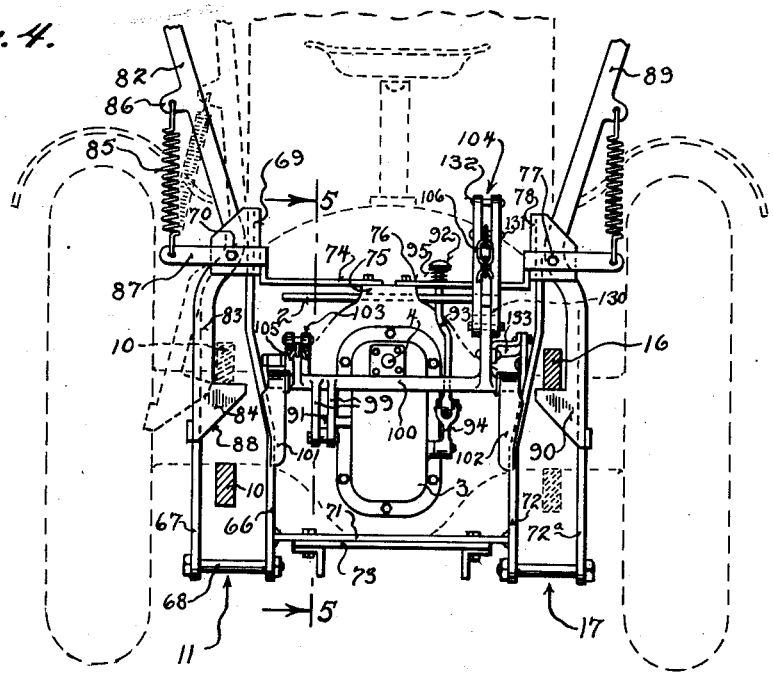
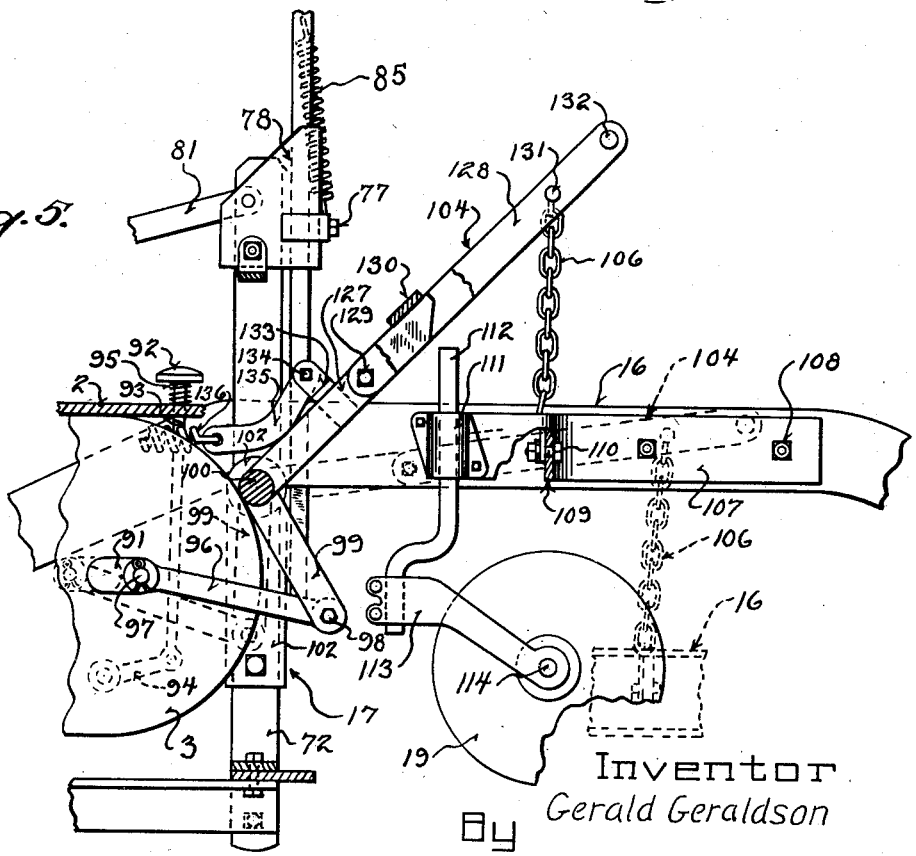
Inventor
Gerald Geraldson
By Emerson B. Donnell
Attorney July 18, 1944.  G. GERALDSON  2,354,084
TRACTOR ATTACHMENT
Filed Dec. 9, 1940   3 Sheets-Sheet 3

Inventor
Gerald Geraldson
By
Emerson B. Donnell
Attorney

Patented July 18, 1944

2,354,084

UNITED STATES PATENT OFFICE 2,354,084

TRACTOR ATTACHMENT

Gerald Geraldson, Rockford, Ill., assignor to J. I. Case Company, Racine, Wis., a corporation Application December 9, 1940, Serial No. 369,148

8 Claims. (Cl. 97—47)

The present invention relates to plows and more particularly to two-way or hillside plows such as are adapted to be mounted directly on a tractor or other propelling means, and an object of the invention is to generally improve the construction and operation of devices of this class.

A further object is to provide a plow which is readily attachable to a tractor and cooperable with instrumentalities which are provided on the tractor for other or general purposes.

Further objects are to provide improved means for attaching a plow to a tractor; improved means for adjusting a tractor mounted plow and improved means for lifting such a plow by power from the tractor.

Other and further objects will become apparent from the annexed specification and accompanying drawings in which Figure 1 is a perspective view of the invention applied to a tractor, parts of the tractor being removed to more clearly show the features of the plow.

Fig. 3 is an enlarged detail of a portion of the construction shown in Fig. 2.

Fig. 4 is a rear elevation of the attachment with parts broken away.

Fig. 5 is a sectional view taken on the line 5—5 of Fig. 4.

Figure 6:
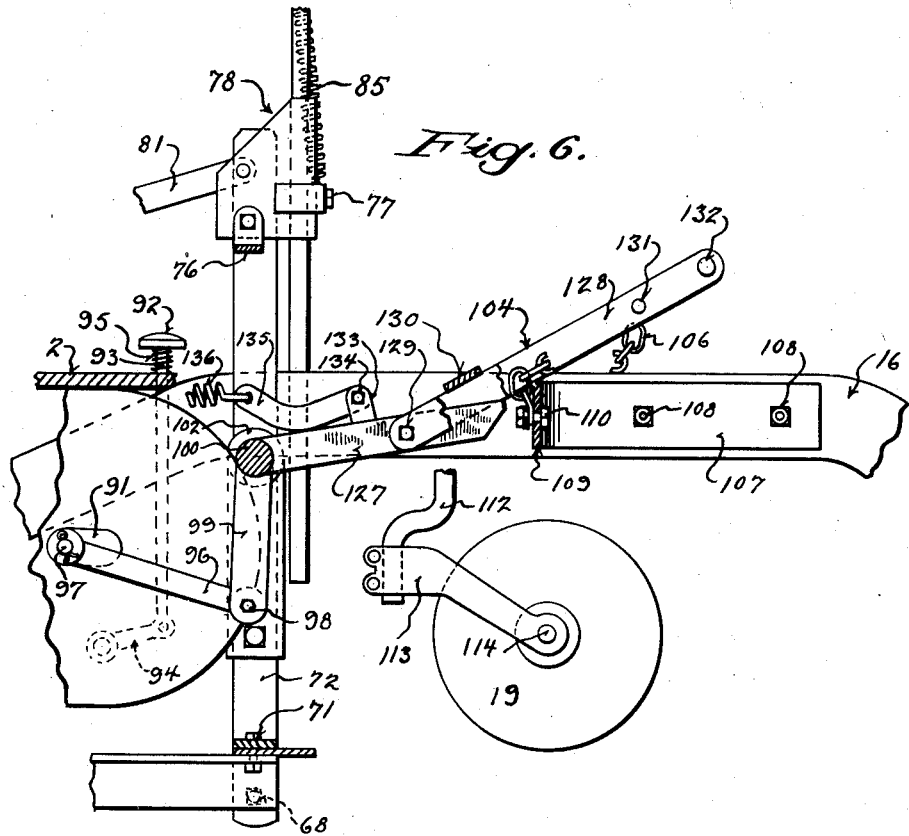
Fig. 6 is a similar view with the parts in another position.

As seen in Fig. 1, the plow illustrative of the invention is attached to a tractor of any suitable kind generally designated as T having an engine E, an axle A, rear wheels as R, front wheels as F, and in the present instance a pilot truck 1, although it is to be understood that the invention is not to be taken as limited to the combination of the plow structure with any specific type of tractor. The tractor is also provided with a foot board 2 and a power lift mechanism generally designated as 3 of suitable or well-known construction operated by a power take-off shaft 4 actuated from engine E in any suitable or well-known manner. The details of tractor T being otherwise well-known, it should not be necessary to describe it further.

The illustrative plow disclosed is particularly adapted for two-way operation and comprises generally two complete units, identical except that one is adapted for right hand operation and the other for left hand operation. It will be necessary, therefore, to describe only one side in detail, namely, the left side as shown particularly in Fig. 1.

The plows in the present instance are drawn from the pilot truck 1, a shank or other means 5 being clamped or otherwise suitably secured to truck 1 and having an arm or bracket 6 depending to a suitable point 7 for the connected draw bar or pull bar 8 to clear the bottom of engine E. Pull bar 8 extends rearwardly to a cross bar or hitch bar 9 which in the present instance constitutes a pivotal connection of pull bar 8 with beam 10. Beam 10 continues rearwardly through a beam guide generally designated as 11 and connects with a plow bottom generally designated as 12 and which is of suitable construction forming no part of the present invention. Spaced rearwardly from bottom 12 is a tail wheel generally designated as 13 and which serves certain purposes of a gage wheel and as a rolling landside. A rolling or other suitable coulter 14 is attached to beam 10 if required for the usual purposes.

As above suggested, the construction so far described is duplicated on the far side of the tractor as seen in Fig. 1, the right hand plow bottom 15 being carried by a beam 16 in a guide 17 and having a rolling landside 18 and coulter 19.

Figure 2:
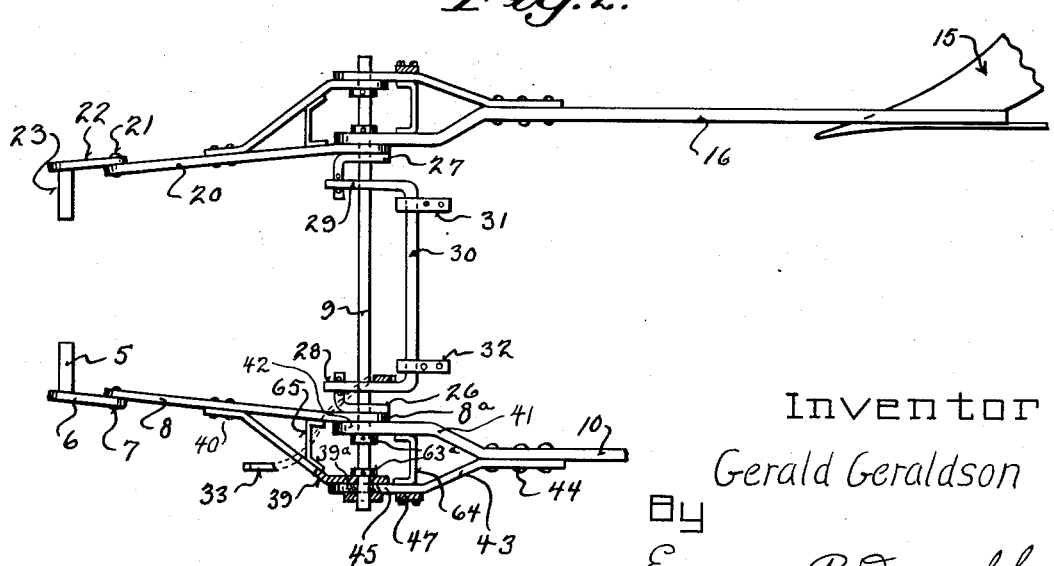
Fig. 2 is a plan view of the attachment removed from the tractor, parts being removed and others broken away to show detail features.

As seen in Fig. 2, beam 16 connects, in the present instance, through cross bar 9, with a pull bar 20 pivoted at 21 to an arm 22 connected with a shank 23 clamped or otherwise fixed to the far side of pilot truck 1. It will thus be seen that plow bottoms 12 and 15 are drawn by the tractor from a hitch point which is closed to the ground according to recognized good practice, and that the beams are free to pivot relatively to pull bars 8 and 20 although guided against excessive movement by guides 11 and 17.

Cross bar or hitch bar 9 is controllable in an up-and-down direction as will appear, and therefore constitutes a means of regulating the height of the hitch point and accordingly of the depth of plowing, any change in the height of the hitch point guiding the plow for deeper or shallower plowing in well-known manner. Cross bar 9, however, cooperates with rolling landsides 13 and 18 by virtue of the fact that the latter are spaced backwardly a substantial amount from the points 24 and 25 of plows 12 and 15. Assuming land side 13 for example to be resting on the furrow bottom, it will be apparent that it will prevent further penetration of the plow and thus act as a gage wheel. A change in the height of cross bar 9, considering beam 10 as a lever, will cause an appreciable change in the actual height of point 24, a similar action taking place, of course, in the case of plow 15. Thus land side 13 may act as a gage wheel, stopping further penetration of plow point 24 as soon as wheel 13 contacts the bottom of the furrow being formed. A change in the height of cross bar 9 will change the point at which wheel 13 contacts the solid earth and prevents further penetration.

Cross bar 9 as particularly shown in Fig. 2 is supported on links 26 and 27 pivoted to arms 28 and 29 of a rocking element generally designated as 30 pivotally supported in bearings 31 and 32 suitably fixed in the present instance with the under side of tractor T. Element 30 may be rocked in any suitable manner in the present instance being provided with an arm 33 which is offset to extend upwardly beside the tractor. A link 34, Fig. 1, connects with a control lever generally designated as 35 pivotally supported for example from axle A as will appear. Rocking of lever 35 will accordingly actuate arm 33, rocking element 30 and raising or lowering cross bar 9. A hand grip 36 connects in suitable or well-known manner with a detent or latch 37 which engages with a quadrant 38 fixed for example with axle A. Lever 35 may be located within convenient reach of the tractor operator so that the height of cross bar 9 and accordingly the depth of plowing may be controlled at any time.

During plowing as is well-known, one wheel of the tractor ordinarily runs in the furrow so that the tractor leans to one side. This leaning varies in accordance with the depth of plowing, being more for deep plowing and less for shallow plowing. An adjustment of the attitude of plows 12 and 15 is therefore necessary in order that they will form a furrow with a level floor regardless of the position of the tractor. This is conveniently effected as follows:

Pull bar 8, Figs. 2 and 3, has a bearing portion 8ª connecting with cross bar 9, and a brace 39 is riveted or otherwise rigidly fixed at 40 with pull bar 8 and engaged with cross bar 9 at a bearing 39ª spaced from the point of engagement of pull bar 8 with cross bar 9. This gives a spaced two-bearing engagement with cross bar 9 to prevent twisting of pull bar 8. A similar construction is used with pull bar 20.

It will be apparent that a comparatively stiff pulling unit is provided by pull bars 8 and 20, cross bar 9 and the connections between the pull bars and cross bar, rocking unit 30 preventing appreciable inclination of the cross bar laterally relatively to the tractor. A comparatively fixed and unchangeable hitch point is accordingly provided from which angular adjustment of the plow beams may be effected.

Beam 10 in the present instance is somewhat offset at 41 near where it connects with cross bar 9 and has a bearing portion 42 connecting with the cross bar but with sufficient freedom to provide for limited rocking movement. A brace 43 is riveted or otherwise fixed with beam 10 as at 44 and has a yoke portion 45 enclosing cross bar 9 and providing a slot 46 for up-and-down adjustment of brace 43.

As will be apparent the mechanism so far described provides for pivotal movement in a longitudinal plane of pull bar 8 and beam 10 about cross bar 9, cross bar 9 remaining at all times substantially parallel to the transverse axis of the tractor, although variable in height, relatively thereto. Also, up-and-down adjustment of yoke 45 relatively to cross bar 9, will result in a twisting or rolling motion of beam 10 relatively to pull bar 8. Suitable means is provided for obtaining and maintaining this adjustment.

In the present instance a standard 47 is fixed in any suitable manner as by bolts 48—48 with brace 43 and has fulcrumed thereon on a pin, stud or the like 49 a lever 50 having a detent 51 extending through a slot 52 in lever 50 into engagement with notches 53—53 in the present instance for convenience formed in standard 47. Lever 50 has an arm 54 projecting from the region of fulcrum 49 above cross bar 9 and connected as by a pin 55 with a link 56 extending downwardly and connecting with cross bar 9.

Assuming cross bar 9 to be fixed in position (which it is by virtue of lever 35 and its connected parts) pin 55 becomes the fulcrum for lever 50 and movement of lever 50, assuming detent 51 to be disengaged from notches 53, will cause up-and-down movement of pin 49, raising standard 49 and accordingly brace 43, thus bringing about the raising or lowering of yoke 45 and twisting or rolling adjustment of beam 10, sufficient rocking movement being possible in bearing 42 to provide for this.

Detent 51 is preferably urged into engagement with notches 53 by suitable means as a spring 57 compressed for example between a washer 58 and an abutment 59 carried on lever 50. Detent 51 has an actuating rod 60 extending longitudinally of lever 50 and having a grip or handle portion 61 for disengaging the detent upon actuation of the lever by means of handle 62. Other suitable detent means and actuating means therefor are contemplated as equivalent.

Suitable collars as 63 or the like are provided for maintaining the position of the parts on cross bar 9. Also, a strut 64, Fig. 2, is in the present instance interposed between beam 10 and brace 43 to brace the parts against a tendency to close together under the pull of the tractor against the plow. A strut 65 is preferably interposed between pull bar 8 and brace 39 for a similar purpose.

The mechanism so far described will serve all the purposes of efficient plowing, the means for lifting the plows for transportation and for selecting the plows to be effective being as follows:

As above noted, guides 11 and 17 are substantially identical and only one need be described in detail. As seen in Fig. 4, guide 11 comprises an inner strap 66 extending generally in an upright direction and an outer strap 67 spaced from strap 66 and also extending in an upright direction. Straps 66 and 67 are spaced apart at their lower ends as by a bolt or spreader member 68 and connected at their upper ends by a fitting 69 carrying a fulcrum pin 70 for a purpose to appear. Guide 11 is connected to guide 17 as by a strip 71 united in the present instance with strap 66 and an inner strap 72 of guide 17. Strip 71 for convenience, rests upon tractor platform 73 supporting guides 11 and 17 and resulting in a strong and stable support for the guides which at times are called upon to carry a large proportion of the weight of beams 10 and 16 with their attached plow bottoms.

Guide 11 is connected by brace 74 in the present instance with a boss 75 and a similar brace 76 connects guide 17 with above mentioned boss 75. Guide 17 has a fulcrum pin 77 carried in a fitting 78 uniting strap 72 with a strap 72ª. To further brace guide 11, a strut 79, Fig. 1, extends forwardly from fitting 69 to a clamping means generally designated as 80, Fig. 1, for securing it rigidly to axle A. As indicated, clamping means 80 may for convenience also be utilized to secure above mentioned quadrant 38 and a fulcrum 80ᵃ of lever 35. A similar brace 81 extends from fitting 78 to a clamping means not shown on the opposite side of tractor T and which is preferably substantially identical with clamping means 80, except that since there is no counterpart of lever 35 on this side of the tractor, no provision need be made for a quadrant such as 38 or fulcrum such as 80ᵃ. Guides 11 and 17 therefore provide a readily attachable and detachable unit which may be mounted on the tractor in a solid and stable manner.

Guide 11 has a lever 82 fulcrumed on pivot 70 and extending upwardly to a position for manipulation by the tractor operator. Lever 82 has an arm 83 extending downwardly in the present instance to the rear of guide 11 and having a lip 84 extending substantially across the guide in the path of upward movement of plow beam 10. A spring 85 tensioned between a lug 86 on lever 82 and an extension 87 urges lever 82 in a counterclockwise direction as seen in Fig. 4. Lip 84 has a diagonal surface 88 which is encountered by beam 10 when the beam is raised as will appear, the beam pushing aside lip 84 as indicated in dotted lines and rising to a position somewhat above the lip. Spring 85 then returns lever 82 to the full line position whereupon beam 10 is retained in its raised position by lip 84. A similar lever 89, lip 90 and associated parts, are provided in connection with guide 17. With both beams raised and carried on lips 84 and 90 respectively, it will be apparent that either beam 10 or beam 16 may be dropped and accordingly the left hand or right hand plow put into operation by a pull on either lever 82 or lever 89. The raising of the plow beams is accomplished from above mentioned power lift 3 as will now be described.

Power lift 3 in the present instance includes a driven crank 91, Figs. 4, 5 and 6 arranged to perform a half revolution each time the mechanism is tripped as by a foot pedal 92 carried on a stem 93 and pivotally connected to a rocker 94, stem 93 passing through and being guided if desired by above mentioned foot board 2, a spring 95 or other suitable means returning the pedal after actuation. Suitable mechanism for accomplishing this operation being well-known, it is considered unnecessary to describe it further.

As seen in Fig. 5, crank 91 is connected to raise the plow beams upon performing a half turn from a forwardly extending to a rearwardly extending position. A pitman 96 pivoted on a crank pin 97 connects through a pin or the like 98 with an arm 99 bifurcated if desired and fixed with a rock shaft 100, journaled in bearing portions 101 and 102, Fig. 4, carried respectively by inner straps 66 and 72 of guides 11 and 17. Other means for supporting rock shaft 100 is contemplated as equivalent, but an advantage of carrying bearings 101 and 102 from guides 11 and 17 resides in the removability of the guides, rock shaft, control levers, etc., as a unit from the tractor.

Rock shaft 100 carries composite arms generally designated as 103 and 104, Fig. 1, extending rearwardly over plow beams 10 and 16 respectively, and connected by suitable means as chains 105 and 106 with beams 10 and 16. It will now be apparent that movement of crank 91 from the dotted position shown in Fig. 5 will cause movement of arm 99 from the forward or dotted position to the rearward or full line position causing rocking of rock shaft 100 and upward movement of composite arm 104 from the lower dotted position to the upper or full line position, raising beam 16 from the lower or plowing position to the upper full line position for transportation. As will be apparent, composite arm 103 in Fig. 1 will perform the identical operation with respect to plow beam 10, both beams being raised to their highest position when the mechanism stands in the position shown in full lines shown in Fig. 5.

Assuming both beams in transport position, and the tractor about to begin the traversing of a field, if it is desired to throw the soil to the right it is only necessary to pull lever 89 thus releasing plow beam 16 for descent and press foot pedal 92 causing crank 91 to traverse a half turn from the full line to the dotted position in Fig. 5. This will lower both arms 103 and 104 and would lower both plow beams 10 and 16, except that lip 84, Fig. 4, prevents downward movement of beam 10 upon downward movement of arm 103, so that only the right hand plow bottom connected with beam 16 is lowered. At the end of the field it is only necessary to again press foot pedal 92 when crank 91 will perform another half turn to the full line position in Fig. 5 thus raising both arms 103 and 104 and plow beam 16, beam 10 being already raised and held on lip 84 will not be affected by the upward movement of arm 103 except slightly near the end of such upward movement, it being advisable for the arms to raise the beams slightly above the transport position to insure the movement of lips 84 and 90 beneath the beams.

An alternative manner of use of the structure is to trip power lift 3 by means of foot pedal 92, but instead of releasing pedal 92 immediately, holding it down until crank 91 has passed from the dotted position of Fig. 5, through the full line position, whereupon the crank will continue until it has made a full turn, or returned to the dotted position. Arms 103 and 104 will then raise whichever beam happens to be in plowing position (or both beams if both should happen to be down for any reason) the beams being retained in raised position by lips 84 and 90, while arms 103 and 104 are returned to the dotted position shown in Fig. 5. When it is desired to start the next furrow, the pull on either lever 82 or 89 will release the appropriate plow beam to drop by gravity and start work substantially immediately.

It is noted that a power lift providing a full turn upon pressing of pedal 92 might be provided and used, within the contemplation of the invention in which case it would be unnecessary to hold the pedal down into the second cycle, as above described. However, such a power lift would not be so convenient for the majority of purposes as the one described.

Any suitable means for securing chains 105 and 106 to plow beams 10 and 16 may be used within the contemplation of the invention, in the present instance, a bracket 107 being fixed as for example by bolts 108—108 with beam 16 and having an offset portion 109 carrying a bolt or the like 110 with which chain 106 is engaged. Bracket 107 for convenience also carries a clamp generally designated as 111 of suitable or well-known type engaging a shank 112 extending downwardly and to which is clamped a coulter yoke 113 carrying, as on an axle 114, above mentioned coulter 19. A similar bracket 115, Fig. 1, carries a clamp 116, shank 117 and yoke 118 carrying an axle 119 and above mentioned coulter 14. Chain 105 may be connected to bracket 115 in the same manner as chain 106 is connected to offset portion 109 of bracket 107.

Gage wheel 18 in the present instance is carried on an arm 120 fixed with a portion 121 of the frog 122 of plow bottom 15, frog 122 being clamped to beam 16 as by a bolt or the like 123 engaged in a slot 124 to provide for adjustment of the attitude of plow bottom 15 relatively to beam 16. A set screw or the like 125 may be engaged in portion 121 to readily effect adjustment of the frog when bolt 123 is loosened. Identically similar structure including an arm 126 is used in connection with plow bottom 12 and need not be further described.

As indicated in Figs. 1, 5 and 6, there may be interference between composite arms 103 and 104 and parts associated with beams 10 and 16 respectively. To provide for free movement of rock shaft 100, arms 103 and 104 are arranged to be upwardly yieldable. Thus as particularly seen in Fig. 6, arm 104 comprises a portion 127 fixed with rock shaft 100 and extending rearwardly to a point short of offset portion 109 of bracket 107 when beam 16 is in its raised position. The remainder of arm 104 comprises a portion 128 pivoted as by a pin 129 to above mentioned portion 127, in the present instance at a point spaced from the rearward end of portion 127. Portion 128 is preferably bifurcated. A stop 130 extends across the opening in portion 128 as seen in Fig. 4, and rests upon portion 127 when arm 104 is in lifting position, as seen in Fig. 5. A plurality of rivets, bolts or the like 131 and 132 extend across the space within portion 128 and to which above mentioned chain 106 may be alternatively connected as may be required by conditions. As will be apparent, arm 104 functions as a rigid member so long as beam 16 is lowered. However, in the event that beam 16 is maintained in its raised position on lip 90, and arm 104 is lowered by rocking of rock shaft 100, portion 128 may encounter and rest upon offset portion 109 of bracket 107 as shown in Fig. 6, whereupon portions 128 and 127 will pivot about pin 129 and provide for further downward movement of portion 127 without interference from bracket portion 109. Identical construction is used in connection with arm 103 and need not be further described.

Assisting springs are used in the present instance to relieve the power lift mechanism of part of the load, thus portion 127 has an ear 133 fixed therewith to which is pivoted as by a pin or the like 134 a link 135 extending forwardly and connecting with a spring 136 tensioned between said link and an anchorage 137, Fig. 1, extending across the tractor. Anchorage 137 is suitably fixed for example with a portion of engine E. A similar assisting spring 138 is connected as by an an adjusting bolt 139 with anchorage 137 and connects through a link 140 with an ear 141 on a portion 142 of arm 103 corresponding substantially exactly with above mentioned portion 127 of arm 104. The spring construction being substantially identical on the two sides of the tractor, no further description is considered necessary.

The pull on springs 136 and 138, as will be apparent, exerts a continuous turning effort in a counter-clockwise direction as seen in Figs. 1, 5 and 6, thereby assisting power lift 3 in the lifting of the relatively heavy plow beams, the springs, however, not being sufficiently strong to interfere with the downward movement of arms 103 and 104 after the beams are raised and in contact with lips 84 and 90.

The operation of the two-way plow is thought to be apparent from the above description, the plow being readily attached to the tractor at the front by shanks 23 and 5, bearings 31 and 32 being applied and guides 11 and 17 and their attached parts being mounted at the rear. Upon connection of pitman 96 to power lift crank pin 97 and the connection of link 34 and anchorage 131, the attachment is complete. The plows are raised to transport position by actuation of foot pedal 92 and arms 103 and 104 may be allowed to return to a downward position whereupon either the right or left hand plow may be dropped substantially instantaneously by a pull on either lever 89 or 82. The plows are pulled from a low hitch point in the present instance represented by cross bar or hitch bar 9 which point may be adjusted up or down by lever 35 to cause shallow or deep plowing as desired. Gage wheels or rolling landsides 18 and 13 cooperate with cross bar 9 to effect this result. Beams 10 and 16 are relatively free to "float" or find their own position behind the tractor within limits defined by guides 11 and 17 and adjustment for compensating for the tilt of the tractor when plowing either deep or shallow may be promptly effected by changing the position of brace 43 through lever 50, it being understood that substantially identical mechanism is used in connection with and for effecting a corresponding adjustment of beam 16.

The above being a complete description of an illustrative embodiment of the invention, what is claimed as new and desired to be secured by Letters Patent of the United States is:

1. In a plow for attachment to a tractor, the combination of a unit including a plurality of pull bars pivotally attached to the front of the tractor and extending rearwardly therebeneath, a cross-bar connected with said pull bars rearwardly of the pivotal connection and extending transversely between them, and a plurality of plow beams pivotally connected with said unit to be propelled thereby, means for vertically adjusting said unit for adjusting the plowing depth, means for angularly adjusting said plow beams relatively to said unit, power lift means adapted for simultaneously lifting said plow beams and means individual to said plow beams for retaining them in raised position independently of each other.

2. In a plow for attachment to a tractor, the combination of a pull bar pivotally connected with the forward portion of the tractor, a cross-bar connected transversely to the pull bar rearwardly of the pivotal connection, means for vertically adjusting the cross-bar, a beam pivotally connected to said pull bar and means connected with said cross bar for angularly adjusting the beam in a transverse plane relatively to said pull bar.

3. In a plow for attachment to a tractor, the combination of a pull bar connected with the tractor, a cross-bar connected transversely to the pull bar, a plow beam pivotally connected to the cross-bar and including a brace engaging the cross bar at a point spaced from the beam, said brace providing a slot extending in an up-and-down direction and within which said cross-bar is engaged, a link connected with said cross-bar, and adjusting means engaged with the link and adapted to shift said brace and said cross-bar relatively to each other for changing the location within said slot at which said cross-bar engages said brace for adjusting said plow beam angularly in a plane transverse to said beam.

4. In a plow for attachment to a tractor, the combination of a pull bar connected with the tractor, a cross-bar connected transversely to the pull bar, a plow beam pivotally connected to the cross-bar and including a brace engaging the cross-bar at a point spaced from the beam, said brace providing a slot extending in an up-and-down direction and within which said cross-bar is engaged, and adjusting means for shifting said brace and said cross bar relatively for changing the location within said slot at which said cross bar engages said brace for angularly adjusting said beam in a transverse plane.

5. In a plow for attachment to a tractor, the combination of an attaching bracket fixed at the front of the tractor, a pull bar pivotally connected with the attaching bracket, a hitch bar connected transversely to the pull bar and rearwardly of the pivotal connection, means for vertically adjusting the hitch bar, a plow beam pivotally connected to said pull bar and means connected with said plow beam and said hitch bar for angularly adjusting the beam in a transverse plane relatively to said pull bar.

6. In a plow for attachment to a tractor, the combination of an attaching bracket fixed at the front of the tractor, a pull bar connected to the attaching bracket, a hitch bar connected transversely to the pull bar rearwardly of the pivotal connection, a plow beam connected to said hitch bar and means connected with said beam and with said hitch bar for angularly adjusting the beam in a transverse plane relatively to said pull bar.

7. In a plow for attachment to a tractor, the combination of a unit including a plurality of pull bars pivotally attached to the front of the tractor and extending rearwardly therebeneath, a cross-bar pivotally connected with said pull bars rearwardly of the pivotal connection and extending transversely between them, and a plurality of plow beams pivotally connected with said unit to be propelled thereby, means for vertically adjusting said unit for adjusting the plowing depth, means for angularly adjusting said plow beams relatively to said unit, power lift means adapted for simultaneously lifting said plow beams and latch members engageable with said plow beams for retaining them in raised position independently of each other.

8. In a plow for attachment to a tractor, the combination of a unit including a plurality of pull bars pivotally attached to the front of the tractor and extending rearwardly therebeneath, a cross bar connected with said pull bars rearwardly of the pivoted connection and extending transversely between them, and a plurality of plow beams, said combination including a rock shaft extending transversely of the tractor for vertically adjusting said unit for adjusting the plowing depth, said rock shaft having spaced arms extending in a direction substantially longitudinally of the tractor, connections from said arms connecting with said cross bar at spaced points, and a controlling device for rocking the rock shaft, means for angularly adjusting said plow beams relatively to said unit, power lift means adapted for simultaneously lifting said plow beams and means individual to said plow beams for retaining them in raised position independently of each other.

GERALD GERALDSON.